United States Patent [19]

Inrig et al.

[11] 3,984,643
[45] Oct. 5, 1976

[54] METHOD AND APPARATUS FOR ESTABLISHING A PLURALITY OF SIMULTANEOUS CONFERENCES IN A PCM SWITCHING SYSTEM

[75] Inventors: Scott Alexander Inrig, Ottawa; Alan Stanley John Chapman, Kanata, both of Canada

[73] Assignee: Northern Electric Company Limited, Montreal, Canada

[22] Filed: Apr. 24, 1975

[21] Appl. No.: 571,363

[52] U.S. Cl. .................. 179/18 BC; 179/15 AT
[51] Int. Cl.² .................................... H04M 3/56
[58] Field of Search .......... 179/18 BC, 18 J, 15 AP; 178/17.5, 26

[56] References Cited
UNITED STATES PATENTS

| | | | |
|---|---|---|---|
| 3,381,087 | 4/1964 | Achramowicz et al. | 178/26 R |
| 3,551,600 | 12/1970 | Berch | 179/18 BC |
| 3,692,947 | 9/1972 | Lewis | 179/18 BC |
| 3,796,833 | 3/1974 | Lewis et al. | 179/18 BC |
| 3,908,089 | 9/1975 | Picandet | 179/18 BC |

*Primary Examiner*—Thomas A. Robinson
*Attorney, Agent, or Firm*—Achmed N. Sadik

[57] ABSTRACT

A pair of interchangeable memories is provided, one of which receives a PCM frame while simultaneously transmitting one, while the other of which, containing the previous frame, outputs the channel bits for parallel processing. Each simultaneous conference is assigned a temporary storage location in which the associated channels are accumulated to yield the total conference signal. Subsequently, each channel is subtracted from its conference total to produce the final conference signal. The final conference signals replace the unprocessed frame in the memory where, at the end of the current frame, it is interchanged with the other memory. And so on.

14 Claims, 3 Drawing Figures

METHOD AND APPARATUS FOR ESTABLISHING A PLURALITY OF SIMULTANEOUS CONFERENCES IN A PCM SWITCHING SYSTEM

FIELD OF THE INVENTION

The present invention relates to time division switching systems in general and to conferencing in pulse code modulation (PCM) systems in particular.

BACKGROUND AND PRIOR ART OF THE INVENTION

In a time division multiplexing system sampled or encoded speech signals originated by a subscriber occupy assigned time slots in a repetitive, ordered group of time slots termed a "frame". Connection of two subscribers is achieved by a number of techniques the end result of which is that the information contained in the respective time slots of the two subscribers are bilaterally exchanged. Should three or more subscribers desire simultaneous multilateral connection, i.e. a conference connection, more complicated processing of the time slot information is necessary.

Given a PCM system, the obvious way to realize a conference between subscribers is to algebraically sum the PCM words of the participants except one, and to transmit the sum to the one participant excepted. If this procedure is performed once every frame for each conference participant, a conference connection would have been established. Should the PCM signals be a result of nonlinear encoding (which is usually the case), it would be necessary to linearize the PCM words before they can be summed and to convert each resultant sum to the nonlinear code again prior to its transmission to the appropriate conference participant.

It is because of the foregoing complications and the required expensive circuitry that the prior art, for example U.S. Pat. No. 3,699,264 issued Oct. 17, 1972 to Pitroda et al. shies away from such technique. In the Pitroda patent a simpler approach is chosen; namely, the participant with the numerically largest binary PCM word is chosen as speaker by a multilateral comparator circuit. While this simple approach may be less costly, it is often inadequate in that it does not permit natural multilateral conferencing.

SUMMARY OF THE INVENTION

The present invention provides a method and circuit for realizing conference connections in a PCM switching system, that permits sharing of that circuit by a plurality of simultaneous conferences, each having an arbitrary number of participants limited in principle only by the number of channels within one frame. However, other practical limitations will be discussed later on.

Accordingly, there is provided in a time division switching system wherein a plurality of incoming channels carry pulse code modulated speech signals and are arranged in time sequential frames, a method for establishing a plurality of simultaneous conferences each between at least three predetermined channels, comprising storing an incoming frame; simultaneously processing the stored frame and storing the next incoming frame; storing intermediate processing results for each conference to be established; storing final processing results for each channel; and transmitting the final results starting with the beginning of the frame following said next incoming frame and ending with the end thereof.

PCM systems often utilize companded or nonlinear encoding, hence the processing of the stored frame would not, in most systems, consist only of arithmetic operations. Rather, the contents of each channel, before arithmetic processing, must be expanded or linearized. After the arithmetic processing is completed the final result for each channel is reconverted to the nonlinear form, and then stored finally for transmission.

The method outlined above introduces a minimum delay of two full frames. The first frame delay occurs during the storing of an incoming frame, while the second frame delay occurs in processing the stored frame. While the actual processing may not require or last for one full frame the final results must be kept in storage that long before they can be transmitted. It should be noted that for first level PCM sustems, such as the 24 channel T1 system in North America or the 32 channel system in Europe, one full frame is more than sufficient in duration to permit complete processing of a frame with present state of the art processing circuitry using off the shelf components.

An apparatus, according to the present invention, for establishing a plurality of simultaneous conferences each between at least three predetermined channels in an incoming frame of pulse code modulated speech signals arranged in individual time slots constituting said frame, comprises two interchangeable storage means, each adapted to receive and store said incoming frame, one of the two storage means receiving said incoming frame and simultaneously transmitting its previously stored contents, while the other storage means cooperates with arithmetic processing means for processing the stored information and for storing therein the result of said processing; said two interchangeable storage means and said arithmetic processing means being responsive to timing and control means for clocking, initiating and terminating of operations, including interchanging said two interchangeable storage means at the end of every incoming frame.

BRIEF DESCRIPTION OF THE DRAWINGS

An example embodiment of the invention will now be described in conjunction with the accompanying drawings in which.

DESCRIPTION OF THE EXAMPLE EMBODIMENT

Figure 1:
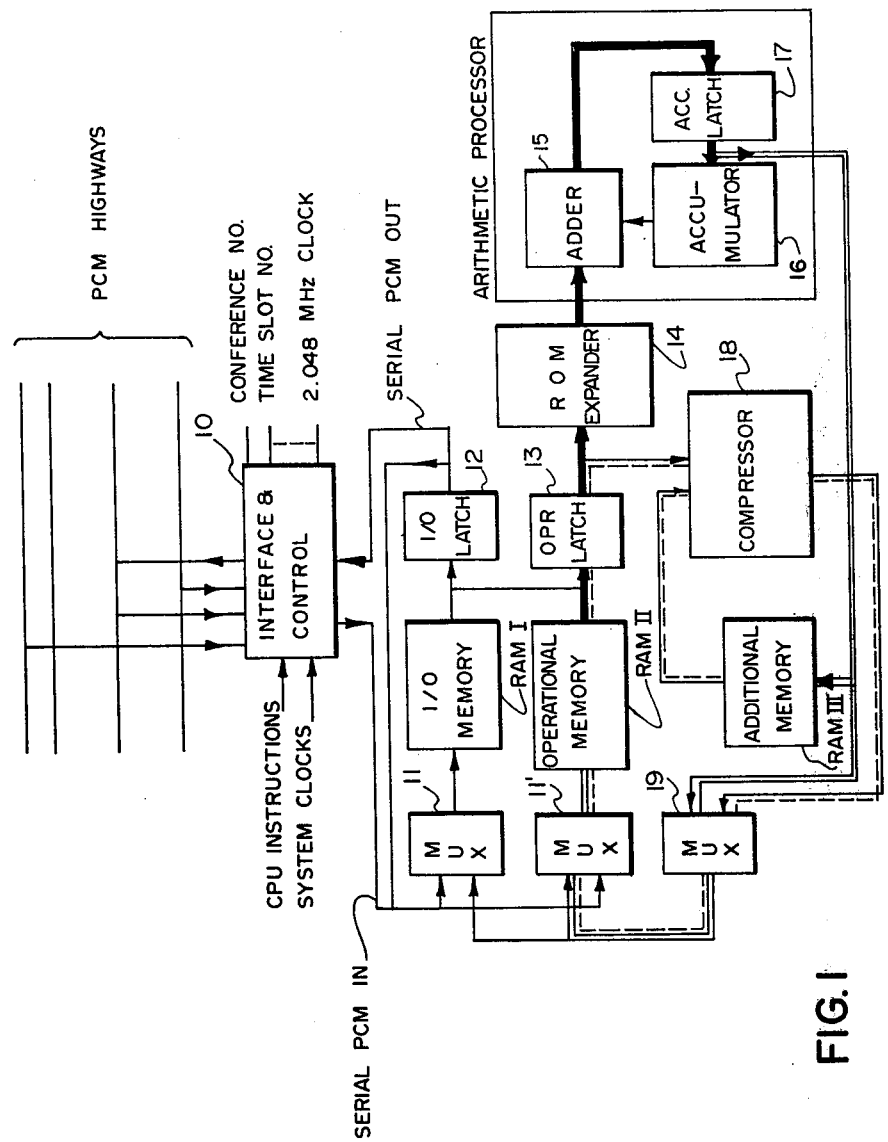
FIG. 1 is a block schematic of a conferencing circuit according to the present invention.

FIG. 1 shows a block diagram of the example embodiment of the present invention. An interface and control unit 10, instructed from the Central Processing Unit (CPU) of the switching system, selects predetermined time slots from the PCM highways of the system and assembles them serially into a serial PCM frame, which is the input to the conference circuit. The selected time slots are those occupied by channels involved in a conference. The serial PCM input accesses via multiplexer switches 11 and 11' one of two random-access memories RAMI and RAMII. The one memory that receives the PCM input is termed the In/Out memory, and is shown in FIG. 1 to be the memory RAMI.

While the In/Out memory RAMI is receiving the serial PCM input, it is simultaneously outputting its contents to an In/Out multiple bit latch 12, which in turn is clocked to deliver a serial PCM stream to the interface and control unit 10, that during predetermined time slots accesses one of the PCM highways of the system.

The operational memory RAMII, containing one frame of PCM data, accesses a read-only memory expander (nonlinear-to-linear PCM code converter) 14 via an operational latch 13. The linear output of the expander 14 is one input to an adder 15, the other input of which is the output of any one of independent storage locations in an addressable accumulator store 16. The storage location in the accumulator 16 is overwritten by the addition result which accesses the accumulator 16 via an accumulator latch 17. The output of the accumulator latch 17 is also the input to an additional random-access memory RAMIII and a multiplexer switch 19, which connects either that output or the output of a compressor (linear-to-nonlinear PCM code converter) 18 to the multiplexers 11 and 11', which in turn access either one of the memories RAMI and RAMII. The compressor 18 receives its input from the operational latch 13 and from the additional memory RAMIII.

In FIG. 1 all control connections from the control unit 10 were omitted in order not to clutter the schematic. The control unit 10 controls the multiplexers 11, 11' and 19, addresses the memories RAMI, II and III and the accumulator 16, and generally times the function of the remaining components of the circuit. Its functions will become apparent in the context of the description of the circuit operation. The circuit is also clocked by two clocks, one at 2.048 MHz being the normal bit rate clock of the switching system, and the second being a clock at twice that rate and synchronous therewith. The second clock is necessary to be able to divide the basic system time slot into four quarters and perform certain consecutive operations within one time slot, that would otherwise require two time slots or more. In addition, there is also the system frame synchronization clock.

The general characteristics of the PCM system of the example embodiment are as follows:

| | |
|---|---|
| Number of channels | 32 |
| Number of bits/channel | 8 (MSB is sign bit) |
| Coding format | companded PCM, $\mu$-law ($\mu$=255) |
| Linear equivalent | 14 bits including a sign and a fraction bit |
| Multiplexing format | isochronous (interleaved) |
| Bit rate | 2.048 Mbits/sec. |

Figure 2:
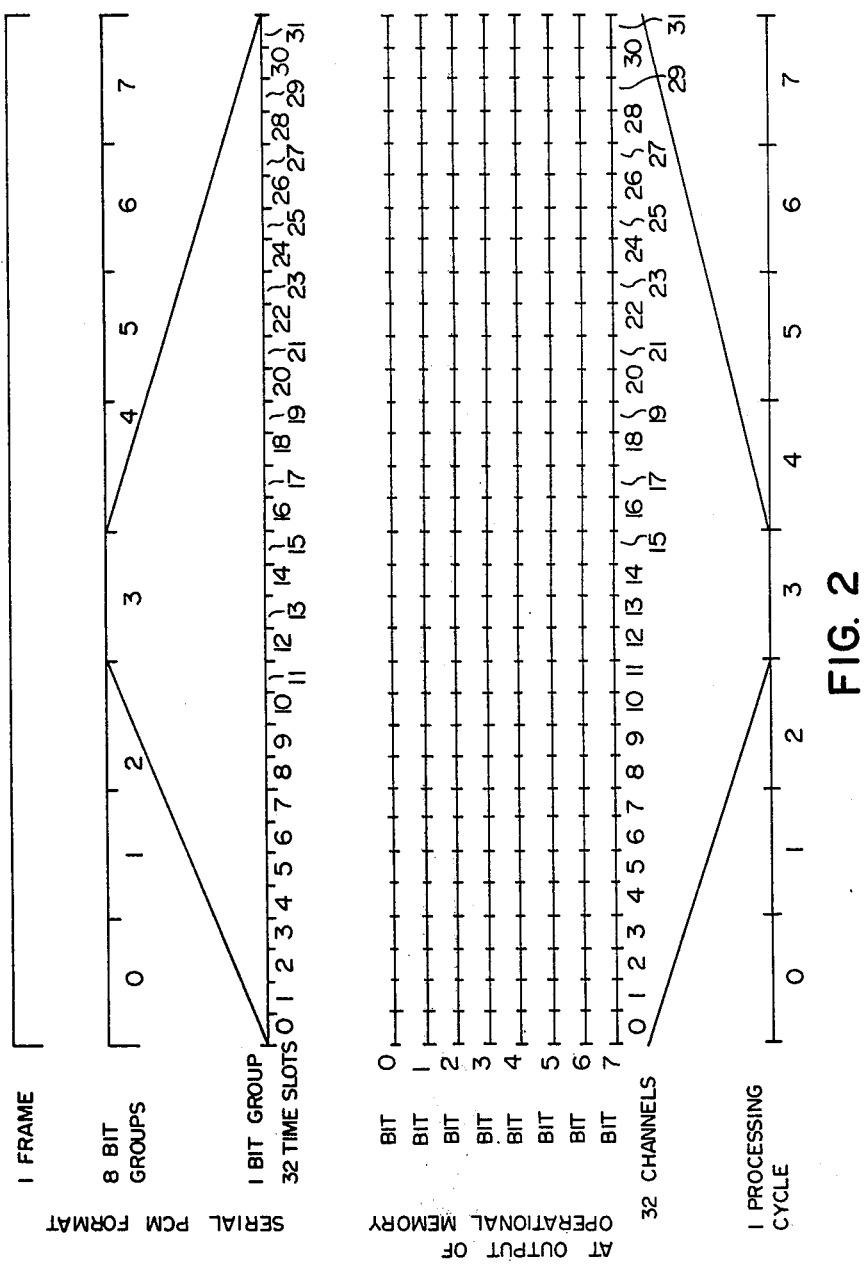
FIG. 2 is an illustration showing subperiods of a PCM frame in relationship at various points of the circuit in FIG. 1.

In FIG. 2 of the drawings one serial PCM frame is shown to have eight bit groups 0 to 7, with each bit group having 32 time slots 0 to 31. The bits of each channel are processed in the conference circuit in parallel. The In/Out memory, therefore, while receiving the isochronous PCM frame serially must present the eight bits of each channel in a single time slot for processing. This is accomplished by means of the multiple bit feedback path from the output of the In/Out latch 12 to the input of the multiplexers 11 and 11' and through them to the input of the In/Out memory. The word bits of the channels become available in parallel at the output of the operational memory so that by addressing the time slots of that memory consecutively, all channels are output in a single bit group period; this is also illustrated in FIG. 2.

One processing cycle of the conference circuit has eight periods 0 to 7, during each of which each channel is available once. In fact, only three periods of a frame are essential for processing all channels in the conference circuit. Briefly summarized, one processing cycle proceeds as follows:

Period 0: No operation;

Period 1: The 8 bit PCM channel word in each time slot is linearized and added to the accumulator storage location associated with its conference, (after each addition, the sum is stored back in the accumulator location);

Period 2: The PCM word in each time slot is linearized and subtracted from the accumulator storage location associated with its conference; the resultant 14 bits are stored partly in the operational memory replacing its original contents, and the remaining 6 bits are stored in the additional memory, the accumulator contents are unchanged;

Period 3: The 14 linear bits of each channel in the operational and additional memories are converted to the companded PCM format in the compressor and stored back into the operational memory replacing the contents from the previous step; and Periods 4 to 7: The additional memory and the accumulator are cleared. At one end of the frame (bits 31 of period 7) the In/Out memory becomes the operational memory and vice versa.

The processing routes in the above cycle are indicated in the circuit of FIG. 1. The heavily traced connections starting from the operational memory RAMII and ending in the accumulator 16 correspond to processing during period 1; the first route extended by the doubly traced connections ending in the memories RAMII and III correspond to processing during period 2; and finally the dotted connections correspond to processing during period 3.

Circuit Operation

Figure 3:
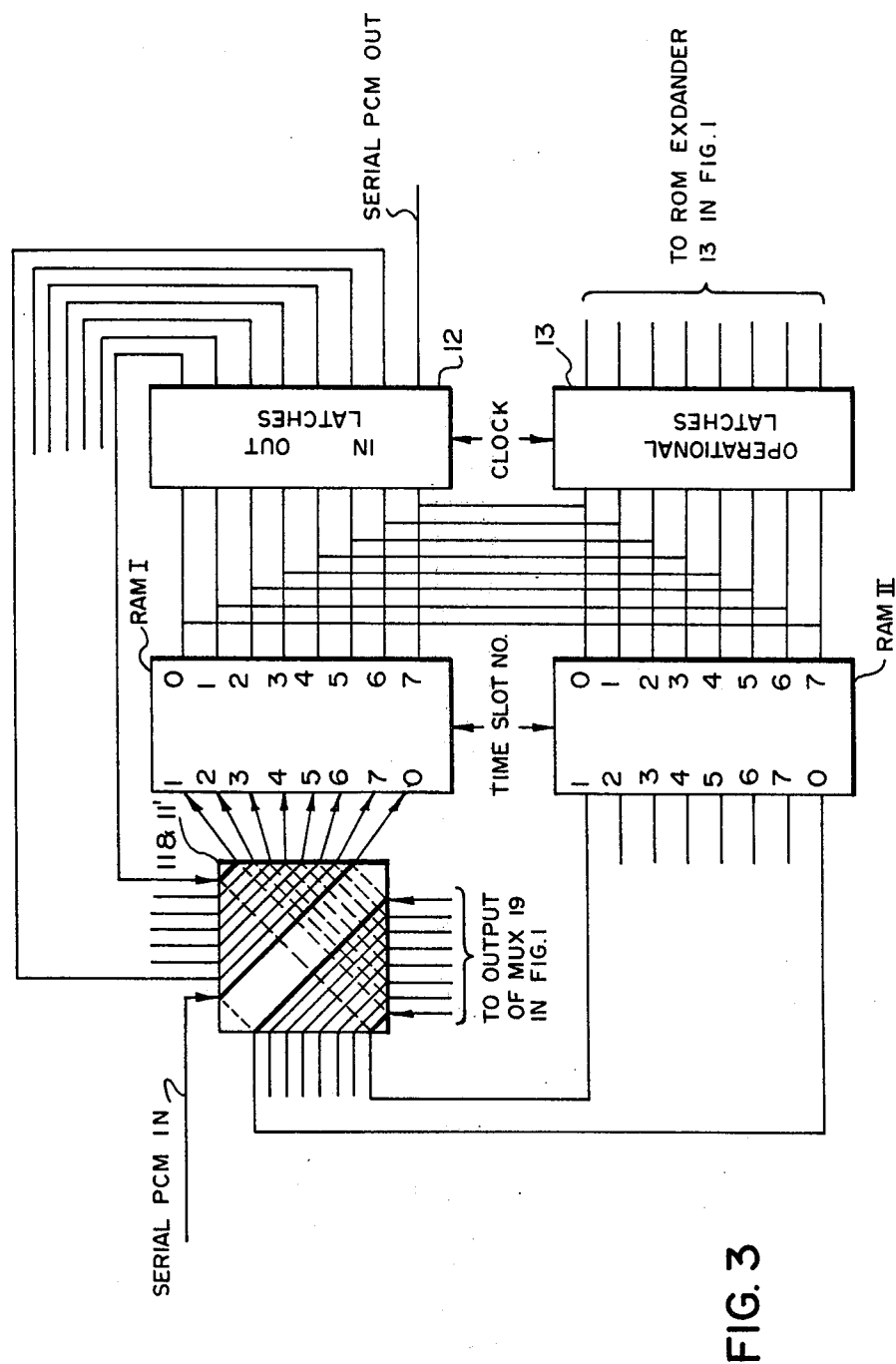
FIG. 3 is a portion of the circuit in FIG. 1 shown in functional detail.

Referring now to FIG. 3 in conjunction with FIG. 1, the operation of the conference circuit will be discussed in more detail. The circuit captures a full frame of PCM serial data supplied by the interface and control unit 10. Each channel extracted from the PCM highways of the system is associated with a conference. Since the multiplexing format of the present system is isochronous (i.e. the channel bits are interleaved rather than lumped together), the 8 bits of a channel are reconfigured to be available in parallel for processing. To illustrate how this is accomplished, reference is made to FIG. 3 which shows the connections of the memories RAMI and II with the associated latches 12 and 13 as well as multiplexer switches 11 and 11' in functional detail. The In/Out memory and the operational memory (RAMI and RAMII in FIGS. 1 and 3, respectively) are organized as 32 word by 8 bit memories. They are addressed by time slot number, being read during the second quarter of a time slot and written during the third quarter. This arrangement permits the simple parallel connection of the outputs of the memories without the need of an external multiplexer switch. The latches 12 and 13 then permit the readout data to be held as long as necessary. As may be ascertained from FIG. 3, the data is skewed so that data read from bit position X of time slot Y is written into bit position $X + 1$ of the same time slot. Bit position 0, time slot Y at the input of RAMI is receiver of serial PCM input data; while bit position 7 of time slot Y at the output of RAMI transmits the previously (during the previous frame) processed PCM data serially. By the end of a frame, the data is arranged in the In/Out memory (RAMI in FIG. 3) such that all 8 bits of a time slot (i.e. channel) appear in parallel at the output of that memory when it becomes the operational memory. Hence, clocking the operational memory through 32 time slots (=1 bit group) produces every channel sample once at the output, (the readout is nondestructive).

In FIG. 3 the multiplexer switches 11 and 11' are shown functionally in one unit; the dotted lines indicate the alternate position of connections, whereby the memory RAMI becomes the operational memory and the memory RAMII the In/Out memory. At the end of every frame of incoming serial PCM data, i.e. at the end of time slot 31 of the bit group 7, the multiplexers 11 and 11' are switched to their alternate position, interchanging the memories RAMI and II. Due to the previously explained reading arrangement of the memories RAMI and II, no such interchange is necessary at the output (provided, that is, the memory units chosen make this possible).

The data captured in the previous frame is presently available for processing in the operational memory RAMII. During group bit period 1 the 8 bit channel word from a time slot is latched at the end of the first quarter of the time slot in the operational latch 13. This data addresses the ROM expander 14, which expander produces a 14 bit linear word including a fraction bit and a sign bit. Such expanders are well known in the art and the only requirement placed thereon is that they produce the linear word in a single clocking operation. The linear word is added in the adder 15 to the contents of the storage location for the associated conference in the accumulator 16. The result of the addition is latched in accumulator latch 17 at the end of the third quarter of the time slot. The new sum is then written in the accumulator 16 into the same location. Note that during any one time slot, the accumulator is addressed by a 4-bit conference number bus which causes only the appropriate conference storage location to be accessible for read/write operations. By the end of bit group period 1, each conference location in the accumulator 16 contains the total sum of the linear words of channels participating in that conference. (The accumulator storage locations have a capacity for 16 bit words in order to accommodate any overflow over 14 bits as a result of addition.)

In the following bit group period 2, the above process is repeated, except that instead of adding, the channel word is subtracted from the associated conference total. The subtraction is achieved by changing the sign bit in the 8 bit input word to the ROM expander 14, which produces (in response to the new address) the 2's complement of the linear word as output. The change of the sign bit (which is the most significant bit) is initiated by a command from the controller 10 that is sustained during bit group period 2. The result of adding the 2's complement of the original word to the total conference words in the accumulator 16 plus 1, is equivalent to the result of subtracting the original word from the total conference words.

The 8 most significant bits of the subtraction result are written into the same time slot location of the operational memory RAMII erasing the previous contents of that location, while the remaining 6 bits of the 14 bit word are written into a corresponding location in the additional memory RAMIII. At the end of bit group period 2, the memories RAMII and III contain the linear conference words.

During bit group period 3, in each time slot, the 14 bit linear conference word stored in the memories RAMII and III is converted to the nonlinear form (i.e. compressed) in the compressor 18. Again, such compressors are well known in the art and the function of compression may be partly or wholly accomplished by table look-up as in the case of the expander 14. During bit group period 3, the multiplexer switch 19 connects multiplexers 11 and 11' with the output of the compressor 18 rather than with the accumulator latch 17 as during other bit group periods. The compressed 8 bit PCM words are now stored into the operational memory RAMII by overwriting the therein previously stored information.

Thus, at the end of bit group period 3, the processing of the PCM words has ended. During the following periods the accumulator 16 is cleared.

At the end of bit group period 7, i.e. at the end of a frame, multiplexers 11 and 11' are switched to the alternate position by a command from the controller 10 exchanging the memories RAMI and II. The whole cycle of processing is repeated on the new frame.

As mentioned before, all time slots not associated with a conference are assigned conference number zero by the controller 10. This is simply achieved by not addressing the accumulator 16 during these channels, so that the four addressing bits are all zero. During these same time slots the output of the compressor 18 is forced to zero, so that the memory RAMII would not contain any data in these time slot locations. Of course, the suppression of data during unused time slots could be achieved at any other suitable point in the circuit. In fact, the controller 10 itself accesses the PCM highway only at those time slots participating in a conference.

Depending on the system in which the conferencing circuit is used, it may be necessary to delay the serial PCM output from the In/Out latch 12 by one or more time slots. This is easily accomplished by a delay memory, which may be integral with the interface and control unit 10.

It was mentioned earlier that practical limitations may restrict the number of conferees in any single conference. One such limitation is the trans-hybrid loss in the line circuits of the conferee stations. There is, however, no well-defined cut-off number of conferees beyond which operation would be impossible. One way to mitigate some of the limitations (trans-hybrid loss, overload, etc.) is to introduce attenuation if the number of conferees exceeds a predetermined number. This could be achieved in the ROM expander 14, which would have sufficient storage capacity to generate either of two sets of linear words, one without attenuation and one (or more) with attenuation. It has been found that a 6dB attenuation is suitable for between 6 and 12 conferees per conference. A one bit command from the control unit 10 is sufficient to instruct the ROM expander 14 whether the unattenuated linear word, or that with 6dB attenuation should be retrieved. Both sets of linear words (two corresponding to one of 256 possible addresses) are, of course, permanently stored in the ROM expander 14.

The conference circuit may be also used in a public address mode. This is accomplished by a one bit command from the control unit 10, which forces the output of the ROM expander 14 to logical 1's during all time slots in a conference except that of the announcer. The lowest order carry in the adder 15 is also forced to logical 1. The announcer's word is thereby unchanged in the conference location in the accumulator 16. This operation is simply illustrated in the following example:

```
announcer's word in the
accumulator 16:                       0 0 1 0 1 1 0 1 0 1 1 0 0 1
add all 1's from the expander 14      1 1 1 1 1 1 1 1 1 1 1 1 1 1
(overflow over 14 bits is ignored)    0 0 1 0 1 1 0 1 0 1 1 0 0 0
add carry +1                                                    1
announcer's word unchanged:           0 0 1 0 1 1 0 1 0 1 1 0 0 1
```

Hence only the announcer's word reaches the listener.

What is claimed is:

1. In a time-division switching system wherein a plurality of incoming channels carry pulse code modulated speech signals and are arranged in time sequential frames, a method for establishing a plurality of simultaneous conferences each between at least three predetermined channels, comprising:
   storing an incoming frame in a first store;
   simultaneously processing the stored frame and storing the next incoming frame in a second store;
   storing intermediate processing results for each conference;
   storing final processing results for each channel by replacing said incoming frame in said first store;
   interchanging said first and second stores at the end of each one of said time sequential frames; and
   transmitting the final processing results starting with the beginning of the frame following said next incoming data frame and ending with the end thereof.

2. The method of claim 1 wherein said speech signals are nonlinearly encoded in pulse code modulated (PCM) words and are converted to linear PCM words prior to the processing thereof; and wherein said final processing results are converted to nonlinear PCM words prior to their transmission.

3. The method of claim 2 wherein said PCM words are binary words, and wherein said processing comprises:
   i. additively accumulating the PCM words of channels associated with the same conference is a separate storage location for each conference; and
   ii. generating said final processing results by algebraically subtracting each of said linear PCM words from the separate storage location associated with its conference.

4. The method of claim 3 wherein said processing includes the step of attenuating said linear PCM words by a predetermined amount.

5. An apparatus for establishing a plurality of simultaneous conferences each between at least three predetermined channels in an incoming frame of pulse code modulated speech signals arranged in individual time slots constituting said frame, comprising two interchangeable storage means, each adapted to receive and store said incoming frame, one of the two storage means receiving said incoming frame and simultaneously transmitting its previously stored contents, the other storage means cooperating with arithmetic processing means for processing the stored information and for storing therein the result of said processing; said two interchangeable storage means and said arithmetic processing means being responsive to timing and control means for clocking, initiating and terminating of operations therein; and said initiating and terminating of operations including interchanging said two interchangeable storage means substantially at the end of every incoming data frame.

6. The apparatus of claim 5, said timing and control means including an alterable memory for associating each number of predetermined channels with one conference.

7. The apparatus of claim 5, said arithmetic processing means adapted to respond to information associating each number of predetermined channels with one conference.

8. An apparatus for establishing a plurality of simultaneous conferences each between at least three predetermined channels in a time-division switching system wherein the speech signals are encoded in binary pulse code modulation (PCM), comprising:
   interface means for arranging said predetermined channels in time sequential frames;
   first and second storage means each adapted to store any one of said frames;
   arithmetic processor means alternately responsive to one of said first and second storage means to produce a conference signal for each of said predetermined channels stored therein;
   first switching means for diverting said conference signals to one of said first and second storage means to be stored therein;
   second switching means for interchanging said first and second storage means at the end of each of said frames; and
   control means for clocking, initiating and terminating of operations in said apparatus.

9. The apparatus of claim 8 in a switching system wherein said encoding in binary PCM is nonlinear, further comprising:
   nonlinear-to-linear PCM converter means alternately responsive to the contents of one of said first and second storage means and driving said arithmetic processor means; and
   linear-to-linear PCM converter means responsive to the output of said arithmetic processor means and driving said first switching means.

10. The apparatus of claim 9 further comprising third storage means for storing the output of said arithmetic processor means prior to its transmittal to said linear-to-nonlinear PCM converter means.

11. The apparatus of claim 10 wherein said arithmetic processor means comprises a parallel binary adder adapted to add two binary linear PCM words, and an addressable memory having a plurality of separate storage locations each adapted to receive and store a linear PCM word having a predetermined minimum number of bits; said addressable memory being addressed by said control means by a conference address during processing of any channel associated with that conference.

12. The apparatus of claim 11, said nonlinear-to-linear converter being prestored conversion tables, and responding to an input PCM word by outputting its linear equivalent.

13. The apparatus of claim 12, said prestored conversion tables also containing the 2's complement of said linear equivalents and said 2's complement being output in response to a signal from said control means.

14. The apparatus of claim 13, said prestored conversion tables also containing an attenuated version of said linear equivalent and of said 2's complement.

* * * * *